Jan. 13, 1959 K. GEBELE 2,868,095
PHOTOGRAPHIC CAMERA CONSTRUCTION
Filed April 27, 1956 4 Sheets-Sheet 1

United States Patent Office 2,868,095
Patented Jan. 13, 1959

2,868,095

PHOTOGRAPHIC CAMERA CONSTRUCTION

Kurt Gebele, Munich, Germany, assignor to Hans Deckel, Munich, Germany, and Friedrich Wilhelm Deckel, Zug, Switzerland Application April 27, 1956, Serial No. 581,056

Claims priority, application Germany April 29, 1955

11 Claims. (Cl. 95—10)

The present invention is related to a photographic camera with built-in exposure meter.

The present trend of camera construction tends to simplify operation as far as possible and thus to exonerate the user from superfluous considerations or calculations. This is particularly the case with cameras with built-in exposure meter. Here the indication of the brightness of the scene to be photographed, as measured by the exposure meter, should be utilized if possible directly, i. e. automatically or semi-automatically, for correctly setting the shutter.

The present invention has the object to provide a camera which permits automatic setting of the shutter in accordance with the indication of a built-in exposure value meter.

The present invention thus has the object to create a camera of this kind which shall permit a speedy setting of the shutter without errors in accordance to the exposure meter, but still permit a selection of the alternative values of choice of speed and diaphragm remaining after setting the shutter to the exposure value.

It has furthermore the object to provide a camera which after being set to a particular exposure value still permits selection of appertaining pairs of shutter speed and diaphragm.

It has furthermore the object to create a camera which permits alternatively automatic setting and setting by hand.

More specifically the present invention is directed to a camera with built-in exposure value meter and is characterised by the fact that exposure value meter and shutter are coupled for the purpose of setting the exposure value, and that before measurement of the exposure value said meter and said shutter are held in an initial position and are brought from this initial position into the position corresponding to the measured exposure value.

The invention will now be explained in detail with the aid of the embodiments shown in the attached drawings.

Fig. 4 shows a detail of the camera in fragmentary horizontal section, and

Figure 1:
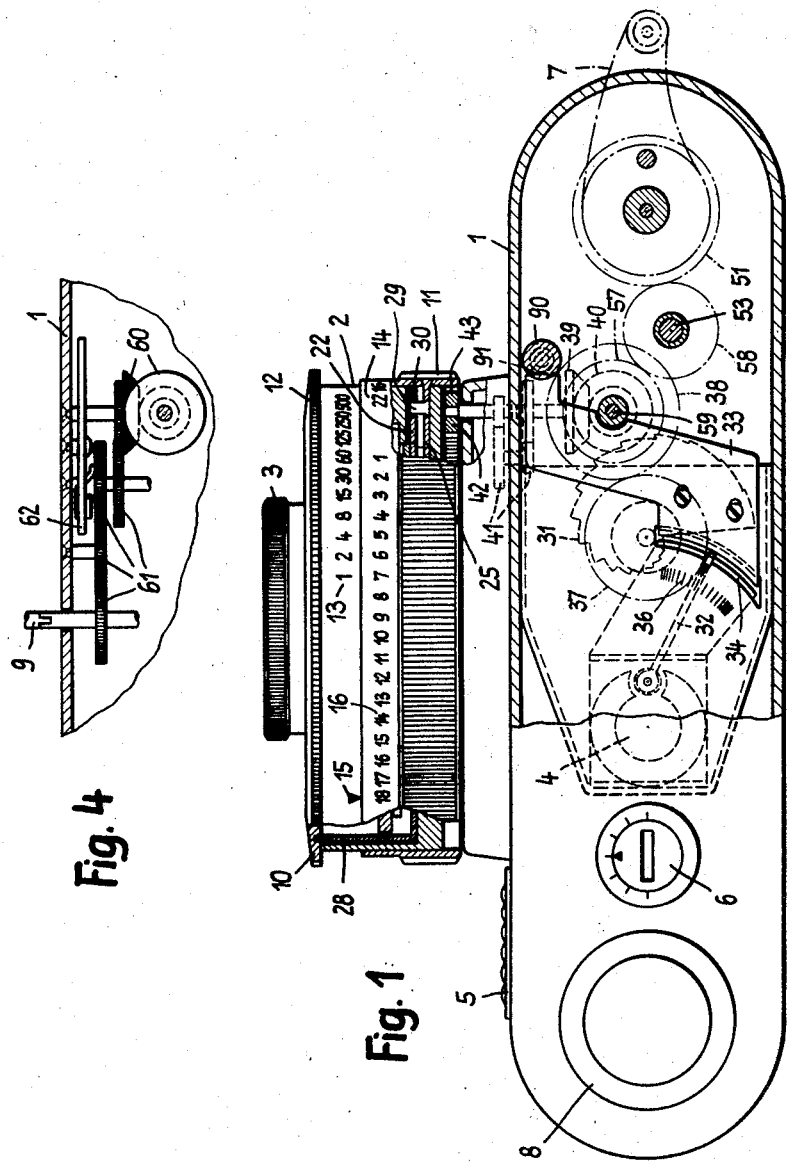
Fig. 1 shows a camera according to the invention in plan view with parts broken away and parts in horizontal section, and Fig. 2 the same camera in a fragmentary vertical section.

Fig. 1 shows a camera according to the invention in plan view and partially in section, wherein all parts not necessary for showing the inventive matter have been left away. The camera comprises the camera body 1, the front wall of which supports shutter 2 and objective lens 3. Inside the camera body is mounted the exposure value meter 4 which is electrically connected to a photocell 5 disposed on the front wall of the camera. When setting the camera it is necessary to consider additionally to the brightness of the scene received by the photocell the film speed and—as the case may be—the reduction factor of an employed filter. Combination of these three values yields the so-called "exposure value," to a particular value of which are related corresponding pairs of shutter speed and diaphragm. Consideration of film speed may be effected by way of example by a corresponding rotation of the entire system of the exposure meter or by insertion of a variable resistance into the photocell circuit which may be set to different film speeds. According to representation a potentiometer 6 connected to the photocell circuit is mounted on the top of the camera. The value indicated by the meter thus is not a brightness value but an exposure value which may be employed for setting the shutter without requiring any further corrections. The fast winding lever 7 is mounted on the top of the camera which is linked to the film transport, to the shutter, and to the exposure meter by gearings to be explained below. The left part of the camera body customarily contains a casette with the film which may be re-wound by means of knob 8.

Figure 2:
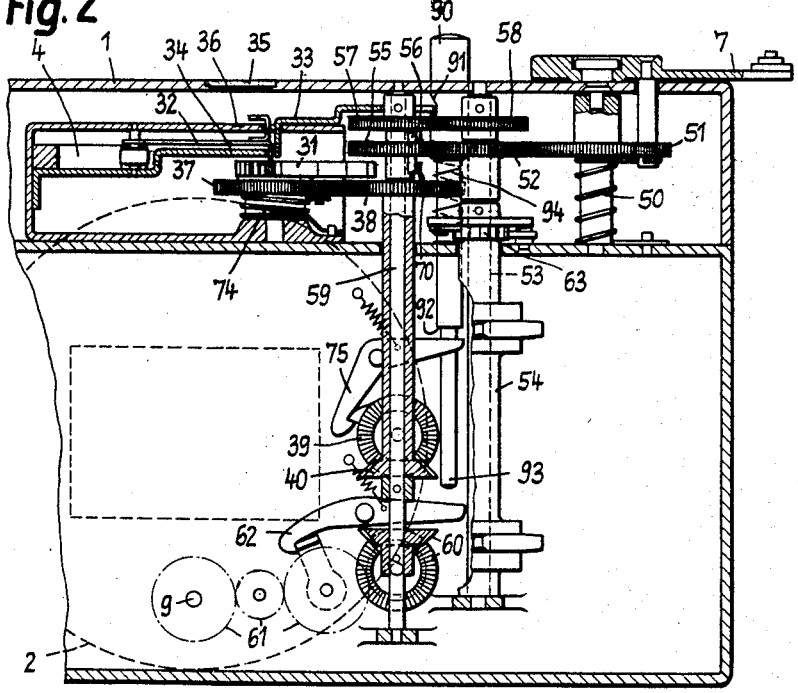
Figure 3:
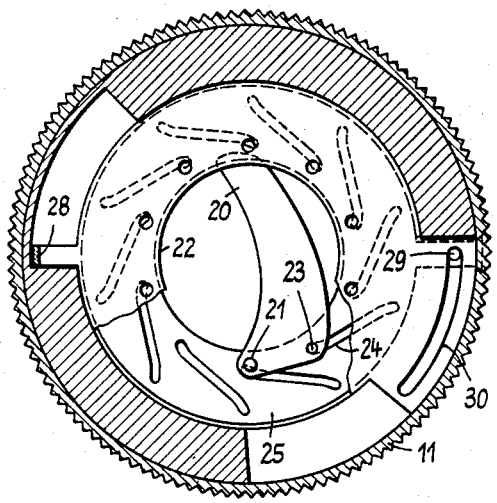
Fig. 3 shows a vertical section through the shutter employed in the camera.

Fig. 2 shows a vertical section through the camera of Fig. 1 which again shows only the parts necessary for explaining the invention and Fig. 3 represents a section through the diaphragm mechanism of the shutter 2 mounted on the front wall of the camera.

This shutter is a between-the-lens shutter of the customary kind which thus need not be described in detail. Except for the differences herein mentioned, the shutter may be essentially the same as the shutter disclosed in the applicant's copending patent application Serial No. 520,875, filed July 8, 1955. With the shutter of this kind winding and release is effected by winding and release means mounted on the camera which are connected with the shutter through a single shaft 9, the so-called winding and release shaft. Two knurled rings 10 and 11 serve for setting shutter speed and diaphragm. The shutter speed may be read on a fixed scale 13 by means of index 12, the diaphragm by means of index 12 and scale 14.

In contrast to the customary shutters this shutter provides the diaphragm mechanism shown in Fig. 3 which provides two separate adjustment means. A diaphragm mechanism of this kind has been described in the U. S. patent application filed October 11, 1955, Serial No. 539,896. The diaphragm blades 20, only one of which has been shown, are pivoted on the rotatable ring 22 by a pin 21 and provide a second pin 23 which glides in a slit 24 of the second rotatable ring 25, respectively. Ring 25 is fixed to knurled ring 11 serving to set the diaphragm. As is shown by Fig. 1 ring 11 supports the diaphragm scale 14 located opposite to index 12. Ring 22 has no access and thus may not be operated from outside. It is fixedly connected to the time setting ring 10 by an arm 28, so that ring 22 is rotated in unison with the speed or time setting ring. Sense of rotation and lay-out of the diaphragm mechanism and the shutter mechanism are so chosen that during common rotation the shutter speed is reduced or increased by the same factor as the diaphragm is increased or reduced, respectively. Thus this fixed connection between shutter setting ring 10 and diaphragm ring 22 ensures that the exposure value is kept constant notwithstanding rotation of the time setting ring 10, i. e. rotation of ring 10 permits to choose anyone of the pairs of shutter time-diaphragm opening values appertaining to the exposure value to which the shutter is set by means of ring 11. In order to obtain this constancy of exposure value shutter time and diaphragm scales must be uniform, i. e. equal variations of the appertaining values must correspond to equal rotations. This is shown in the Fig. 1 by the graduation of the shutter speed scale 13 and diaphragm scale 14. Rotation of the second ring 25 by means of knurled ring 11 permits to vary the diaphragm but to leave unvaried the shutter time. The effective diaphragm opening is determined by the relative position of the two diaphragm rings 22 and 25. The diaphragm opening is read on the diaphragm scale 14 on knurled ring 11 by means of index 12 on time setting ring 10, as the latter is fixedly connected to the other diaphragm ring 22 as mentioned above. The exposure value is thus read by means of an index 15 fixed to the shutter housing on the exposure value scale 16 on diaphragm setting ring 11. If the time setting ring 10 is rotated, the shutter speed is varied but not the exposure value as due to the fixed connection between rings 10 and 22, the diaphragm opening is varied inversely but in identical ratio as the shutter speed. If, however, ring 11 is rotated, the diaphragm is varied but the shutter speed is left constant and consequently also the exposure value is varied.

In order to effect automatic setting of exposure value the diaphragm setting ring 11 is coupled to a follow-up mechanism on the exposure value meter. This mechanism comprises a cam disc 31 which is journalled laterally to the pointer 32 of the exposure value meter 4. A locking or arresting device comprises two locking jaws 33 and 34 which are arranged on opposite sides of the downward-bent pointer 32 in such a manner that by shifting of the movable jaw 33 to the left the pointer is urged and arrested against fixed jaw 34. Hereby the pivots of the pointer system are protected from the forces arising during the follow-up movement. The second arm of pointer 32 bent upwards moves over a scale 36 located beneath a transparent window 35 on the camera top, so that the indication of the exposure value meter may also be read by the operator. If pointer 32 is arrested by the jaws 33 and 34 the cam disc 31 may be turned in counter-clockwise direction until one of its circumferential steps comes into contact with the downward-bent pointer 32. As shown, the cam disc 31 has the form of a stepped spiral, the angles corresponding to the individual steps being of equal value, the (radial) height of the steps, however, being different. In this manner a linearisation of the exposure value indication may be obtained. As is well known the scale of an electric exposure meter is not linear, due to properties of the photocell and of the measuring system. The height of the steps of the cam wheel is adapted to this non-linearity, so that on the whole a linear relation is obtained between the exposure value to be measured and the rotation of the cam disc 31. Cam disc 31 is fixedly connected to a pinion 42 through spur gears 37, 38, 41 and bevelled gears 39, 40 which pinion meshes with a gearing 43 on the internal surface of knurled ring 11. In this manner cam disc 31 and diaphragm setting ring 11 are fixedly coupled to each other. The gear ratio is chosen in such a manner that the entire measuring range of the exposure value meter 4 corresponds to the full exposure value scale steps 1–18. In order to effect the follow-up movement according to the invention the cam disc 31 is brought back to an "initial limiting position" before each measurement. According to representation this is automatically obtained by actuating the winding lever 7 which effects at the same time film transport and winding of the shutter. For this purpose lever 7 is rotated counter-clockwise against the torque of the spring 50. A gear 51 is coupled with the lever which meshes with a gear 52 which is free to turn on shaft 53 of the film transport roll 54. It drives a winding wheel 55 bearing a coupling pin 56 which protrudes upwards and downwards. The upper part of pin 56 cooperates with another pin fixed to gear 57. This gear 57 meshes with gear 58 which is fixed by a pin to the shaft 53 of the film roll. Thus by turning lever 7 film transport roll 54 is rotated by the breadth of one picture. An arresting device 63 is provided to prevent that the film transport roll 54 turns backwards when lever 7 returns to its initial position. At the same time the shutter is wound by means of the winding shaft 9 through shaft 59, the bevel gears 60 and the spur gears 61 and kept in this wound position by an engagement lever 62. Through the winding movement at the same time the cam wheel 31 and the diaphragm ring 11 are brought into their limiting initial position through the intermediary of the lower pin 70 and spur gears 37, 38—42.

According to representation in this "initial position" the shutter is set to its highest exposure value, i. e. to the fastest shutter speed and the smallest diaphragm opening. For this setting diaphragm setting ring 11 as well as time setting ring 10 must be brought into the initial position by the winding lever 7. In the diaphragm mechanism (Fig. 3) the time setting ring 10 is rotated through action of diaphragm setting ring 11 by means of a pin 29 on ring 25 which reaches into a slot 30 of ring 22. When lever 7 is moved thus speed setting ring and diaphragm setting ring are moved into a position corresponding to the initial limiting position from their accidental position after the last exposure. In order that this be possible without exerting great force the speed setting ring must not provide retaining notches in the different positions but must be easily displaceable as the diaphragm adjusting ring.

As mentioned above the initial limiting position corresponds to the highest exposure value. It is of course likewise possible to choose another arrangement where the initial limiting position corresponds to the lowest exposure value. The initial value shown in the present embodiment corresponding to the highest exposure value, offers the advantage that by the automatic process the shortest possible shutter speed will always be selected which is still admissible with the automatically set exposure value, i. e. a shutter speed which under customary conditions will always permit one to make a snapshot from the hand. By this setting to the initial position the spring 74 is wound and diaphragm setting ring 11 and cam disc 31 are held in their initial limiting position by the retaining lever 75. The camera is ready for automatic setting and subsequent exposure.

Release of these operations in correct order is effected by pressing downward release button 90. This button in its upper part provides an inclined surface 91 which cooperates with jaw 33. By pressing button 90, jaw 33 is shifted to the left and urges pointer 32 towards the counter jaw 34 as has been described. By pressing farther, retaining lever 75 is operated by flange 92 of the release button 90. Cam disc 31 may now rotate together with diaphragm ring 11 under the action of spring 74 until the corresponding step of the cam 31 hits upon the clamped pointer 32. Thereby the shutter is adjusted to an exposure value corresponding to the indication of the exposure value meter.

If the release button is further pressed down its end 93 gets into contact with the retaining lever 62 and sets free the shutter mechanism, so that now the exposure is effected.

The subsequent contact made between release button 90 and retainment levers 75 and 62 is easily felt. This feeling may be used to stop the release button in the intermediate position in order to choose freely one of the corresponding pairs of shutter speed and diaphragm, once the corresponding exposure value has been set. This is effected by rotating the shutter speed setting ring 10 by which as already mentioned diaphragm and shutter speed are automatically varied in inverse directions thus leaving constant the exposure value. After selecting a desired pair of values the release button may be pressed further down, whereby the shutter is set to action.

If for any reason no picture is taken after automatically setting the exposure value, i. e. if retainment lever 75 is released but not retainment lever 62 the camera remains in wound (tensioned) state with transported film.

Repeated movement of lever 7 at the next occasion will now again bring the shutter and the exposure value meter to the initial value and the measured exposure value may thus be set anew by pushing down the release member. For this purpose the already mentioned arrangement of pins is employed within the gearing between the fast winding lever and the film transport, comprising members 56, 57 and 70. Due to this arrangement repeated movement of the lever 7 of a wound camera cannot effect any further transport of film or winding of the camera. Only the cam wheel 31 and the diaphragm ring 11 are brought into the initial position as the release button will always move upwards under the pressure of spring 94. Repeated pressure of the release knob may now be used to set a new exposure value corresponding to the new conditions.

With the present arrangement the fast-winding lever 7 before measurement brings the shutter into the initial position simultaneously with winding of the shutter and transporting the film; by actioning the release button the shutter will assume the correct position corresponding to the indication of the exposure value meter.

It is obvious that all these functions may be separated from each other, i. e. a particular operating member may be provided for bringing into the initial position cam wheel 31 and diaphragm setting ring 11, so that operation thereof is effected independently from film transport and/or shutter winding.

At the same time it is possible to provide a particular release member for setting the shutter according to the indication of the exposure value meter. Thus by way of example the dislocation of diaphragm and exposure meter to their initial position may be effected separately together with winding the shutter, with transporting the film or with both. Setting to the measured exposure value may be either effected by a separate release member or, as already explained, by the initial movement of the camera release member before release of the shutter. At the same time it is possible to provide these manners of operation alternatively according to wish.

Figure 6:
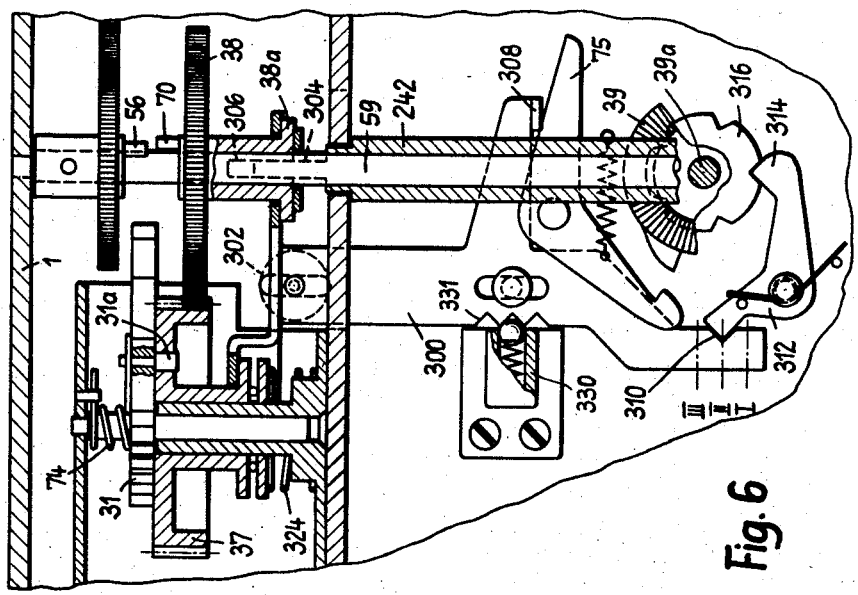
Figs. 5–7 show further modifications of such a camera in a fragmentary vertical section.
Figure 5:
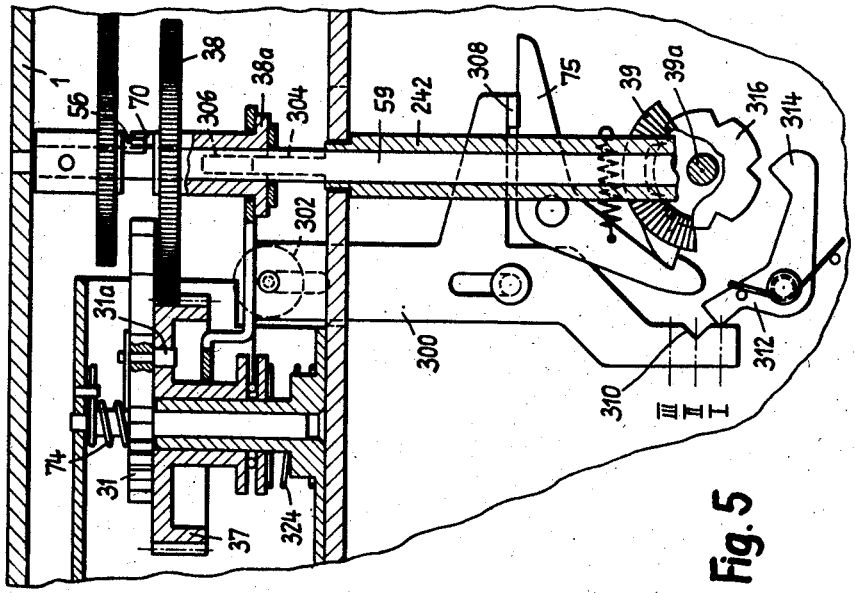
Figure 7:
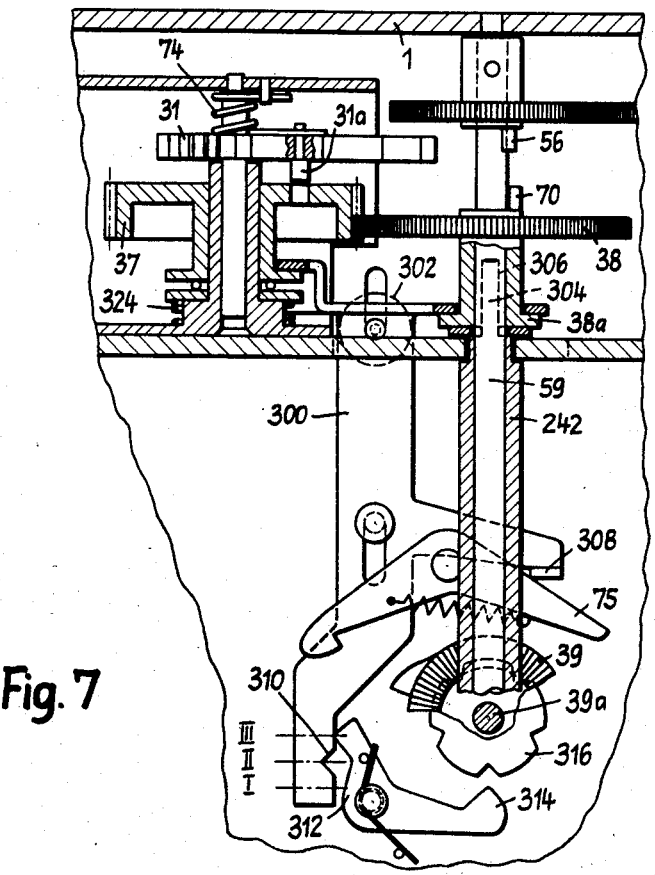

An embodiment for such a construction is shown in Figs. 5 to 7. This embodiment corresponds to the embodiment of Figs. 1–4, with the exception, that the releasable coupling between winding lever and film transport roll has been left away.

Winding lever and film transport are consequently fixedly coupled and a repeated resetting of shutter and exposure meter into the initial position is not possible. If after setting the shutter to the measured exposure value, no exposure is made, the initial position may not be reobtained by repeated operation of the fast winding lever in order to set again the shutter for the exposure. It is, however, possible to effect this by rotating the diaphragm setting ring.

The embodiment shown in Figs. 5–7 permits to separate the gears for setting the exposure value from the gears for transporting the film in order to effect alternatively several photographs with the same exposure value or without automatic setting.

For this purpose the connections of coupling members 70 and 56 are designed releasably in the direction of the axis of the shaft 59. The spur gear 38 for this purpose provides a flange 38a which meshes with a switching member 300 which is mounted shiftably in the camera body 1 and may be operated by a knob 302 protruding from the camera. Operation of bevel gear 40 by spur gear 38 is assured by two forks 304 of bush 242 which reach into axial slots 306 of flange 38a.

The switching member 300 furthermore provides a protrusion 308 cooperating with retainment lever 75 and curve 310 cooperating with a further retainment lever 312 with a retainment wheel 316 on shaft 39a of bevel gear 39. The switching member 300 may be held in one of three different positions (I), (II), (III) by a ball-notch fixation 330 which cooperates with notches 331 as shown in Fig. 6 by way of example. The cam 31 cooperating with pointer 32 of the exposure value meter is not fixedly connected to a spur gear 37 but only releasably coupled thereto. For this purpose a coupling pin 31a meshes with wheel 37. The spring 74 acts directly upon cam disc 31. Spur gear 37 may be shifted on a fixed shaft and this may be effected by moving the switching member 300 against the pressure of a spring 324.

This second embodiment operates as follows: If the exposure value is to be measured anew for every photograph, the switching member 300 remains in its position (I) shown by Fig. 5. Coupling members 56 and 70 as well as cam disc 31 and spur gear 37 are coupled to each other, so that identically to the first embodiment the diaphragm setting member 11 is set to its initial value during film transport and is brought to a position corresponding to the measured exposure value before release of the shutter.

If more than one picture is to be taken with the same setting of the exposure value the switching member 300 is brought to position (II), as is shown by Fig. 6. The drive for the diaphragm setting member is interrupted at 56, 70 and this member is held in a position corresponding to the last measured exposure value by cam 314 of lever 312 entering into one of the slots of retaining wheel 316. Thus the camera may be wound and released as often as desired without varying the exposure value setting, as before free choice of one of the pairs of speed and diaphragm corresponding to the set exposure value is possible.

If, however, the switching member 300 is brought to position (III) as is shown by Fig. 7, not only drive 56, 70 is interrupted, but also is cam disc 31 separated from wheel 37 and wheel 316 is set free by removing retainment lever 314. Thus the diaphragm setting member 11 may be moved and set independently of the film transport and winding actions.

The different modifications shown only are embodiments of the present invention. The invention also might be used with cameras with focal plan shutter or with such embodiments, where a particular exposure value setting may be ensured by means of a gear between the speed setting member and the diaphragm setting member. At the same time the arrangement may be used with cameras with interchangeable objective lenses with in-built diaphragms, where of course a releasable coupling must be provided from the camera to the diaphragm setting member.

What is claimed is:

1. A photographic camera construction including a shutter having an exposure value adjusting member movable through a range of travel for adjusting at least one of the two factors of exposure duration and diaphragm aperture which together determine the exposure value of an exposure, a shutter tripping member movable to initiate an exposure-making operation of the shutter, a control member coupled to said exposure value adjusting member to move therewith, a built-in light meter including a movable member positionable in accordance with variations in light intensity and having a portion constituting an abutment cooperating with said control member to stop motion of said control member in one direction, resilient means tending to move said exposure value adjusting member and said control member in said one direction, a film winding member means operated by movement of said film winding member for moving said adjusting member and control member in an opposite direction to a starting position at one end of their range of travel, means for latching said adjusting member and control member in said starting position, and means operated by said shutter tripping member for unlatching said latching means so that said resilient means may move said adjusting member and said control member in said one direction until said control member is stopped by said movable member of said light meter.

2. A construction as defined in claim 1, in which movement of said shutter tripping member serves to unlatch said latching means at an intermediate stage of movement of said tripping member and before it trips the shutter to make an exposure.

3. A construction as defined in claim 1, further including means for operatively disconnecting said adjusting member and control member from said film winding member so that film may be wound without moving said adjusting member and control member.

4. A construction as defined in claim 1, further including means for operatively disconnecting said exposure value adjusting member from said control member so that said exposure value adjusting member may be set manually and independently of the position of said control member.

5. A photographic camera construction including a shutter having an exposure value adjusting member movable through a range of travel for adjusting at least one of the two factors of exposure duration and diaphragm aperture which together determine the exposure value of an exposure, a movable light meter member positionable in accordance with variations in light intensity, a film winding member, and interconnecting control means selectively settable for operatively connecting said exposure value adjusting member to said film winding member to be moved thereby, for operatively disconnecting said adjusting member from said film winding member so that said winding member may be operated without moving said adjusting member, for controlling the position of said exposure value adjusting member from the position of said light meter member, and for releasing said exposure value adjusting member from said light meter member so that said adjusting member may be adjusted independently of the position of said light meter member.

6. A photographic camera comprising a camera body, a shutter unit mounted on said camera body and having an optical axis, said unit including a shutter speed setting ring and a first diaphragm setting ring both rotatable about said optical axis through a limited range and coupled to each other to rotate with each other, a second diaphragm setting ring also rotatable about said optical axis through a limited range, a light meter unit mounted on said camera body, said meter unit including a pointer movable in accordance with changes in light conditions, a control member rotatably mounted on said camera body for movement from a tensioned position to a run-down position, spring means tending to move said control member from its said tensioned position to its said run-down position, said control member engaging said pointer during the running-down movement of the control member, said pointer serving as an abutment to stop further running-down movement of said control member so that said control member may come to rest at an intermediate position dependent upon the position of said pointer, means for moving said control member to its said tensioned position against the force of said spring means, means for moving both of said diaphragm setting rings to their respective limits of rotation in one direction upon moving said control member to its said tensioned position, and means for operatively connecting one of said diaphragm setting rings to said control member to move therewith during the running down movement of said control member, the other of said diaphragm setting rings remaining stationary during the running down movement of said control member.

7. A photographic camera comprising a camera body, a shutter unit mounted on said body, said unit including a member movable to adjust shutter speed and a member movable to adjust diaphragm aperture, a light meter unit mounted on said camera body, said meter unit including a pointer movable in accordance with changes in light conditions, a control member mounted on said camera body for movement from a predetermined first position to a variable second position determined by contact with said pointer, a spring tending to move said control member in a direction from said first position toward said second position, a gear operatively connected to one of said movable adjusting members of said shutter unit to move said one of said adjusting members by rotation of said gear, said gear and said one of said adjusting members having a first position at one end of their respective ranges of travel corresponding to said first position of said control member, a film transport member rotatable to feed film between successive exposures, a first connection for operatively connecting said control member to said gear to move therewith, a second connection between said film transport member and said gear for turning said gear and said control member connected thereto to their respective first positions upon film feeding movement of said film transport member, a latch for latching said gear in its first position, a movable shutter release member, means for unlatching said latch by movement of said shutter release member so that said spring may tend to move said gear and control member from their respective first positions toward said second position, and a shiftable member for disconnecting said second connection so that said film transport member may be moved to feed film without thereby causing movement of said gear and said one of said adjusting members of said shutter unit toward their respective first positions.

8. A construction as defined in claim 7, further including means operated by said shiftable member for holding said gear in any intermediate position in which it is set.

9. A construction as defined in claim 7, in which said shiftable member is shiftable selectively to three positions, and means controlling said connections from said shiftable member in such manner that in one of said positions of said shiftable member said first and second connections are both effective, and in a second position said second connection is disconnected and said first connection is effective, and in the third position said first and second connections are both disconnected.

10. A construction as defined in claim 9, further including means controlled by movement of said shiftable member to its said second position for latching said gear in any intermediate position in which it is set at the time that said shiftable member is moved to its second position.

11. A photographic camera comprising a camera body, a shutter unit mounted on said body, said unit including a manually operable member movable through a limited range for adjusting said shutter unit to a variable exposure value, an exposure meter unit mounted on said camera body, a control member movable to a variable extent from an initial position to a variable set position in accordance with variations in exposure value indicated by said exposure meter, film winding means, a shutter release member, shiftable coupling means movable from an ineffective uncoupled position to an effective coupling position coupling said control member to said manually operable member for conjoint movement, shiftable driving means movable from an ineffective non-driving position to an effective driving position for driving said manually operable member to one end of its range of travel upon movement of said film winding means, means controlled by operation of said shutter release member for causing said manually operable member to move from said end of its range of travel to an extent corresponding to the variable extent of movement of said control member from its said initial position to its set position, so that when said coupling means and said driving means are both effective each operation of said film winding means followed by operation of said shutter release member will set said manually operable member of said shutter unit anew to the exposure value then indicated by said exposure meter at the time each exposure is made, means for rendering said driving means ineffective and for concomitantly locking said manually operable member in the position in which it is then set, so that a series of operations of said film winding means and shutter release member may be performed to make a series of exposures without setting said manually operable member anew for each exposure, and means for rendering both said driving means and said coupling means ineffective and for unlocking said manually operable member for unobstructed manual adjusting movement, so that it may be adjusted manually for each exposure and will not be moved by operation of said film winding means.

References Cited in the file of this patent

UNITED STATES PATENTS

| | | |
|---|---|---|
| 2,213,742 | Mihalyi | Sept. 3, 1940 |
| 2,282,659 | Kun | May 12, 1942 |
| 2,325,463 | Axler et al. | July 27, 1943 |
| 2,343,206 | Rath | Feb. 29, 1944 |
| 2,596,328 | Dorsey | May 13, 1952 |